Figure 1:
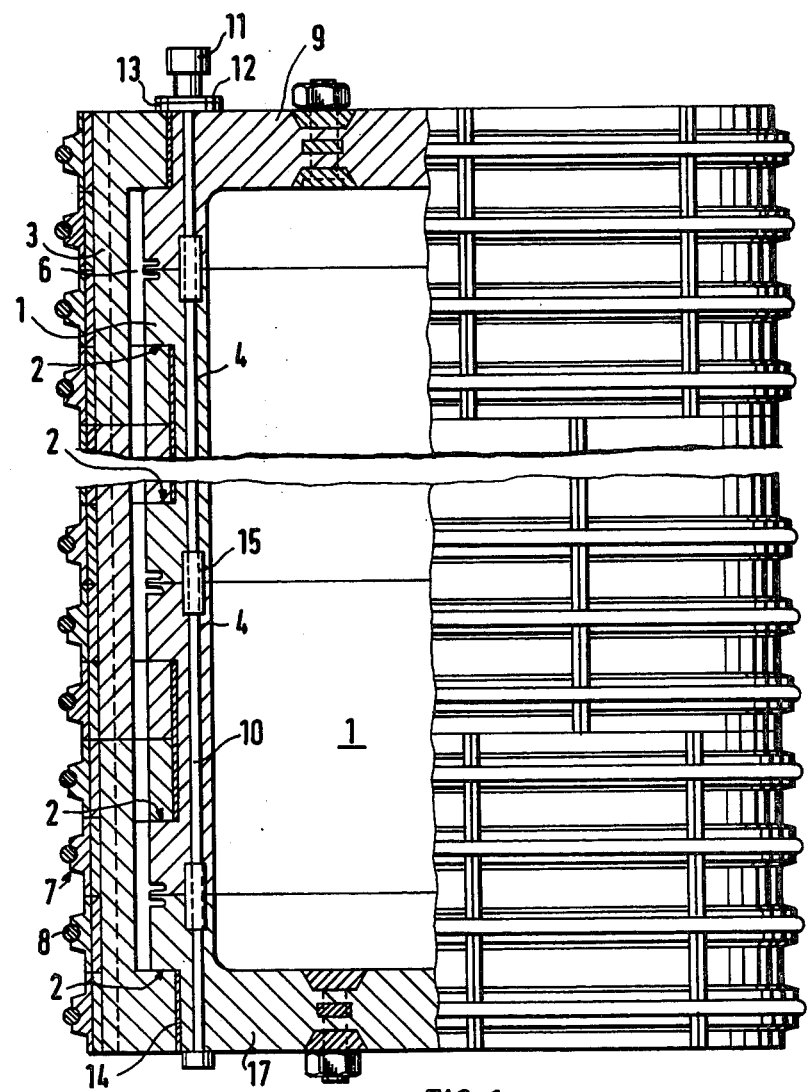

United States Patent [19]

Janakiev

[11] 4,192,718
[45] Mar. 11, 1980

[54] BURST-PROTECTED STEEL PRESSURE VESSEL WITH DOUBLE PROTECTION IN RADIAL AS WELL AS AXIAL DIRECTION

[76] Inventor: Nikolai Janakiev, Thywissenstrasse 69, 4150 Krefeld, Fed. Rep. of Germany

[21] Appl. No.: 811,483

[22] Filed: Jun. 30, 1977

[30] Foreign Application Priority Data

Jul. 1, 1976 [DE] Fed. Rep. of Germany ....... 2629735

[51] Int. Cl.² ............................................. G21C 13/04
[52] U.S. Cl. .......................................... 176/87; 176/38; 52/224
[58] Field of Search ...................... 176/38, 87; 52/224, 52/248, 249, 246, 247

[56] References Cited

U.S. PATENT DOCUMENTS

| 2,414,628 | 1/1947 | Battin | 52/227 |
| 3,377,757 | 4/1968 | Magers, Jr. | 52/224 |
| 3,404,497 | 10/1968 | Burrow | 52/248 |
| 3,537,220 | 11/1970 | Ellis | 52/227 X |
| 3,849,963 | 11/1974 | Harmon | 52/227 X |
| 3,942,031 | 3/1976 | Bahder et al. | 176/87 X |
| 3,965,630 | 6/1976 | Roberts | 52/224 |
| 3,985,614 | 10/1976 | Jungmann | 176/87 |
| 3,987,860 | 10/1976 | Jabsen | 176/87 |
| 4,011,132 | 3/1977 | Kumpf et al. | 176/38 |
| 4,038,136 | 7/1977 | Gallet et al. | 176/87 |
| 4,057,162 | 11/1977 | Gross | 176/87 |
| 4,070,221 | 1/1978 | Anthony | 176/87 X |
| 4,078,968 | 3/1978 | Golden et al. | 176/87 |

Primary Examiner—Peter A. Nelson
Attorney, Agent, or Firm—Michael J. Striker

[57] ABSTRACT

A pressure vessel whose wall is constructed of rings or ring elements of steel or cast-steel plates provided with axial bores for the passage of tension cables and cooling media, said plates being stacked together to form the pressure vessel wall; the cover of said pressure vessel, wherein several thick-walled disc-segment shaped plates are connected with one another via tension screws and a carrier cross.

14 Claims, 15 Drawing Figures

BURST-PROTECTED STEEL PRESSURE VESSEL WITH DOUBLE PROTECTION IN RADIAL AS WELL AS AXIAL DIRECTION

This invention is directed to a burst-protected steel pressure vessel with double protection in radial as well as axial direction.

In the chemical industry, in petrochemical systems and in the reactor field high-pressure vessels are needed as reactor vessels or the like. To withstand the high interior pressure such vessels must be subjected to pre-stressing. The manufacture of such pressure vessels is effected in known manner as multi-layer vessles or as lapped containers from pre-stressed concrete or from assembled cast-iron wall segments which are pre-stressed circumferentially with wedges and axially and horizontally with tension cables. The technical supervisory authorities require such pressure vessels, especially if they are used as atomic reactor vessels, to be provided with dual safety measures to that, if a break occurs of a securing means in radial and axial direction, an additional one is present which prevents complete rupture.

To solve this problem the invention suggests a pressure vessel whose wall is constructed of rings or ring elements of steel or cast-steel plates provided with axial interruptions, e.g. bores, for the passage of tension cables and cooling media, which plates are stacked in layers to form the pressure vessel wall; in the case of ring segments the plates of each layer being offset with reference to those of the preceding layer, preferably by half the length of a segment. At their outer sides the plates have radial cut-outs. A ring-segment of C-shaped cross-section matingly engages in these cut-outs and clamps together at least two, preferably two pairs of plates in superimposed layers so that they have no possibility of movement in axial direction.

According to an advantageous embodiment of the inventive pressure vessel the back side of the ring segments is to form the closed outer surface of the vessel, about which pressure bands are placed.

The vessel is held together in axial direction by the tension cables, and in addition the inventively proposed C-shaped ring segments are present as a safety measure.

In radial direction the vessel is held by pressure bands placed about its circumference. As a further safety measure the invention proposes to provide shear-sleeves or pins with or without threads which are inserted into registering holes or respective pairs of superimposed ring-segment-shaped plates. The rings or ring segments may have cut-outs, such as bores or the like and/or grooves for the passage or cooling medium. Two mutually separated cooling circuits may be formed in this manner.

According to a preferred embodiment of the invention a special circumferential pressure system may be provided, composed of at least two pressure segments, spacer plates and spacer shoes, about which the tension cables or pressure bands are placed and tensioned.

A further aim of the present invention is to provide a cover for high-pressure vessels, wherein the parts making up the cover are so constructed that they can be assembled simply and effectively to form the cover.

To solve this problem a cover of the above described character is proposed, having several thick walled disc-segment-shaped plates which are connected with one another via tension screws and a carrier cross. The carrier cross is advantageously spider-shaped and of two parts, consisting of an upper and a mirror-symmetrical lower part with arms of trapezoidal cross-section, assembled to form a central, preferably hexagonal traverse from the edges of which the arms extend radially and lie in corresponding cut-outs at the edges of adjacent plates, the tensioning screws being extended from one to the other side of the cover through bores in the arms of the carrier cross parts.

According to an advantageous embodiment of the inventive cover the carrier cross may also be provided with polygonal intermediate arms. This is advantageous to obtain greater stability for covers of large diameter. The parts forming the cover may additionally be mechanically clamped, so that first a loose assembly of the cover parts may be formed, which are then clamped and welded together. For this, the tension cables of the tension screws may be surrounded by a sleeve with projection which fit into corresponding recesses of the plates upon turning, in bayonet-closure manner. In another embodiment mechanical clamping can be effected by inserting a strap-shaped wedge—provided with holes for passage of the tension screws—between respectively two radial arms of the upper and lower parts of the carrier cross and parallel thereto, into appropriate radial recesses in the plates which abut one another in the region of the carrier-cross radial arms. The plates can be mechanically clamped to the carrier cross, pre-stressed or welded.

The cover may also be made of disc-segment-shaped hollow plates. To pass, e.g., deactivating rods through the hollow-plate cover an advantageous embodiment of the invention proposes that the tension cables of tension anchors extend between concentric sleeves which lead form one to the other side of the hollow plate, the outer sleeve being welded to the upper and lower plates along an annular seam in the interior of the plates, and the inner sleeve being welded to the upper and lower side of the hollow plate via ring plates respectively ring flanges.

The invention will be described in more detail with reference to the drawing.

Figure 2:
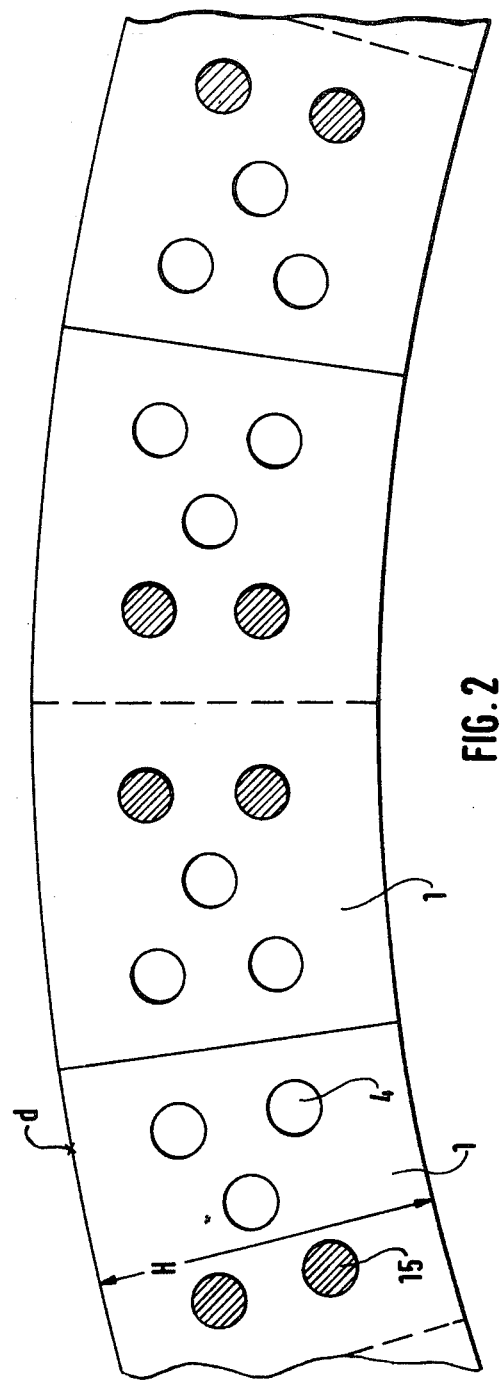
Figure 3:
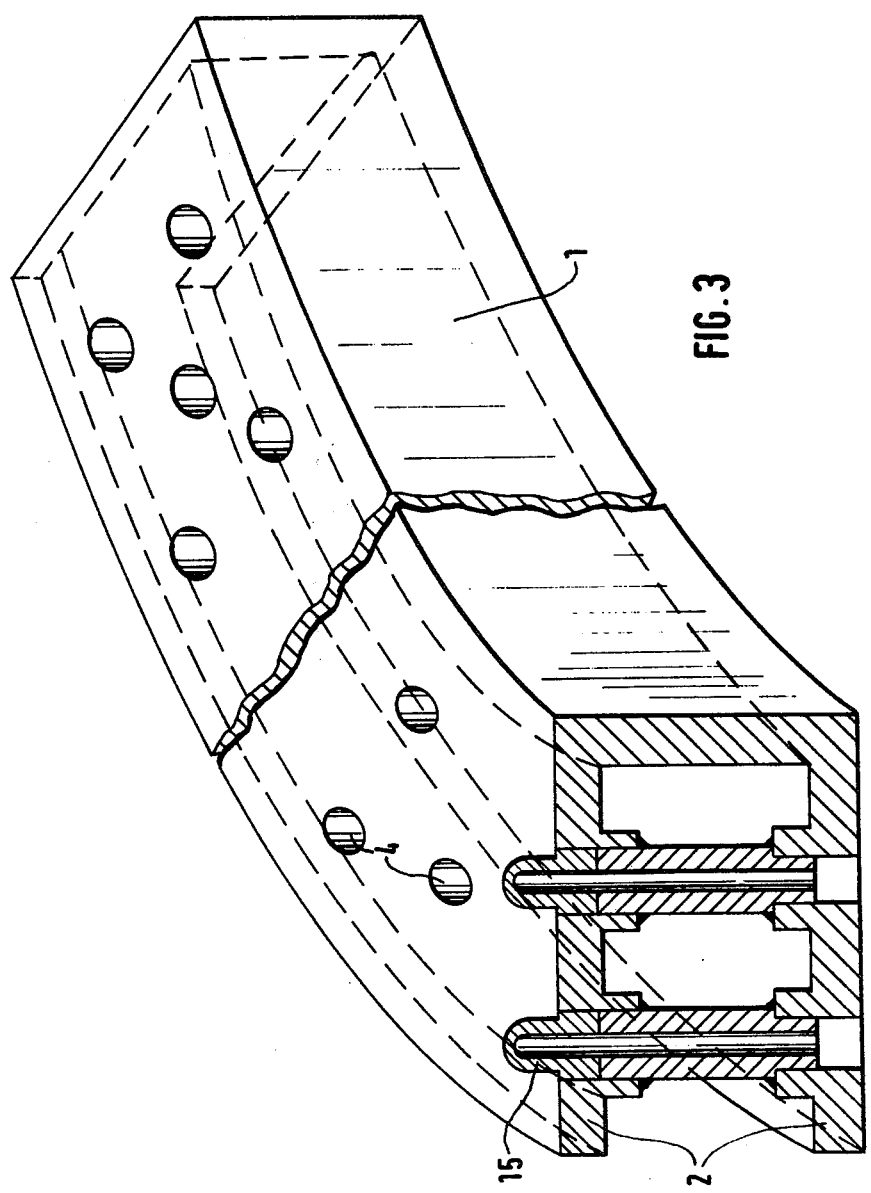
Figure 4:
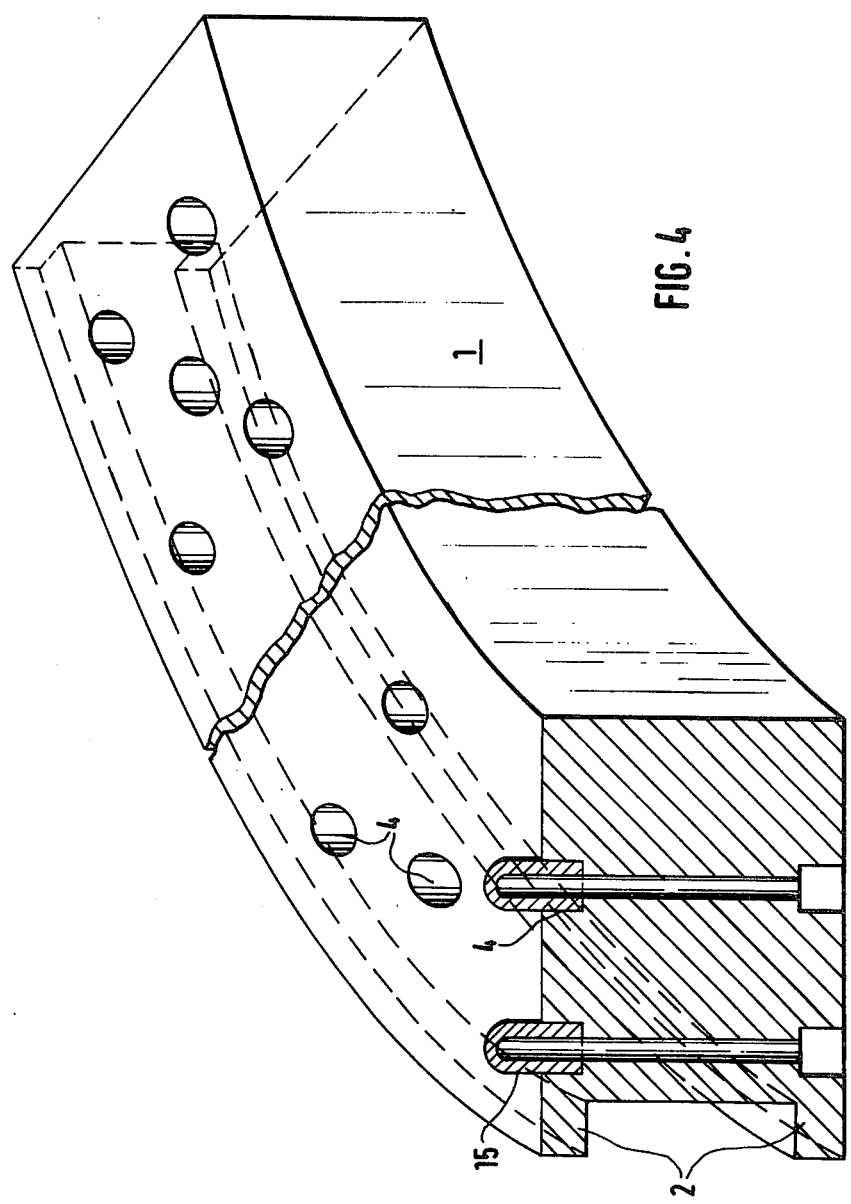
Figure 5:
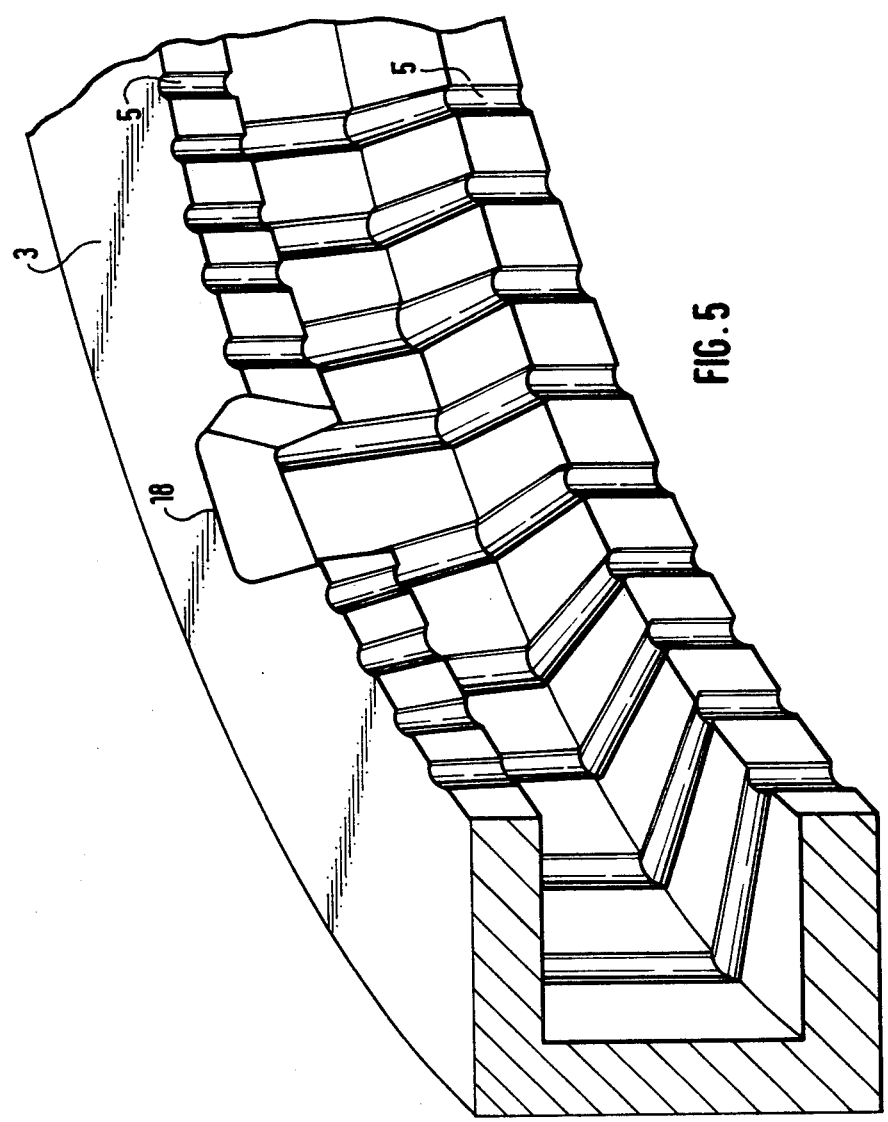
Figure 6:
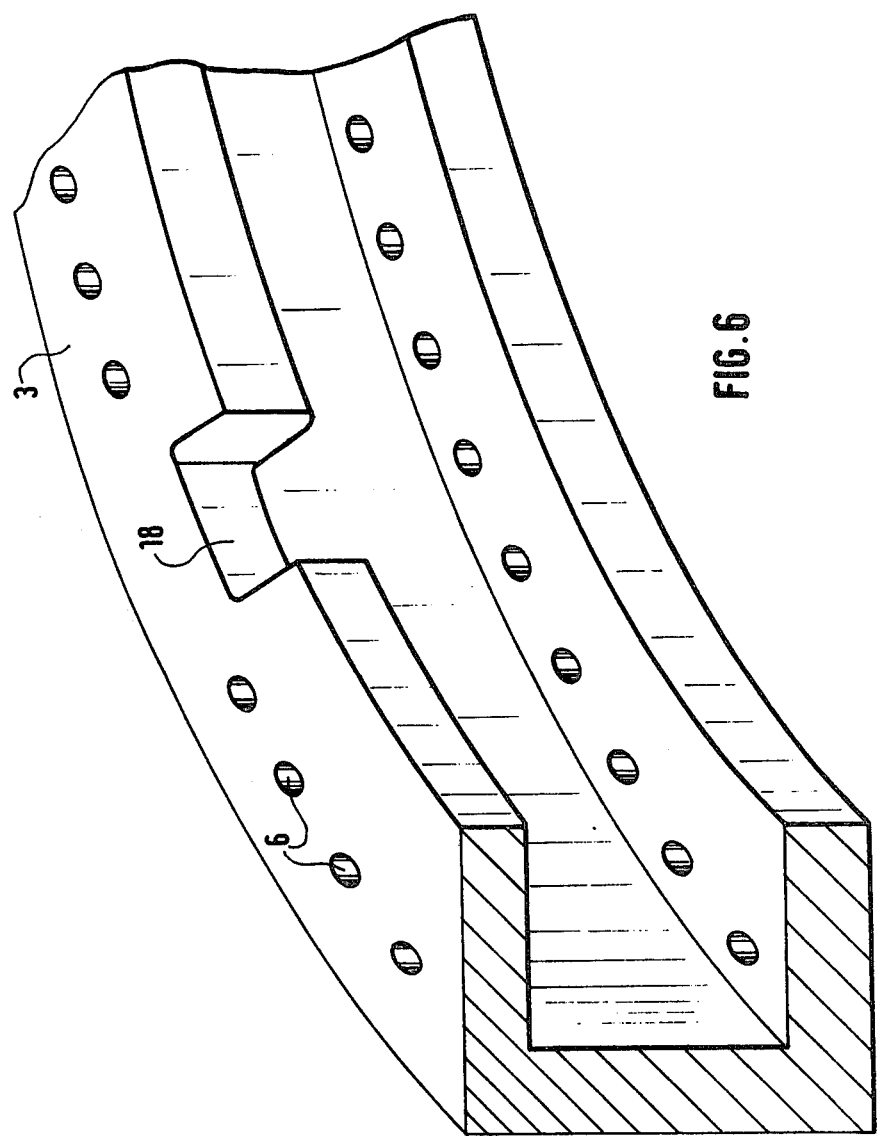
Figure 7:
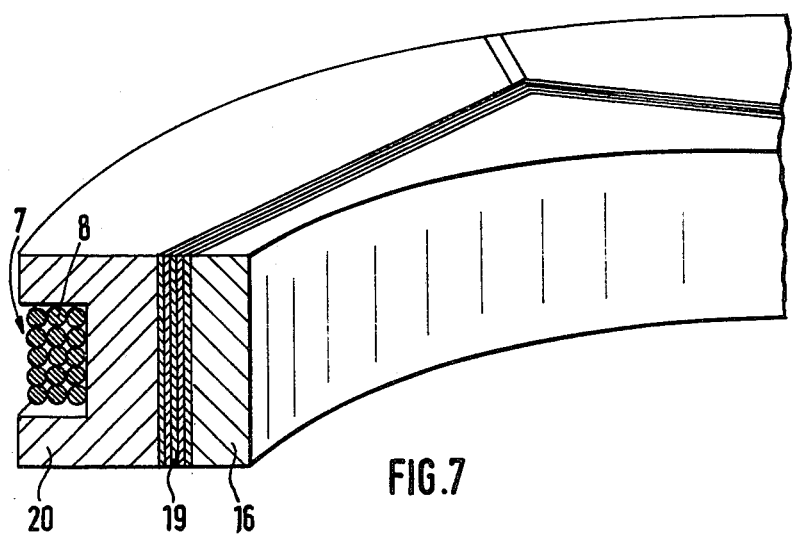
Figure 8:
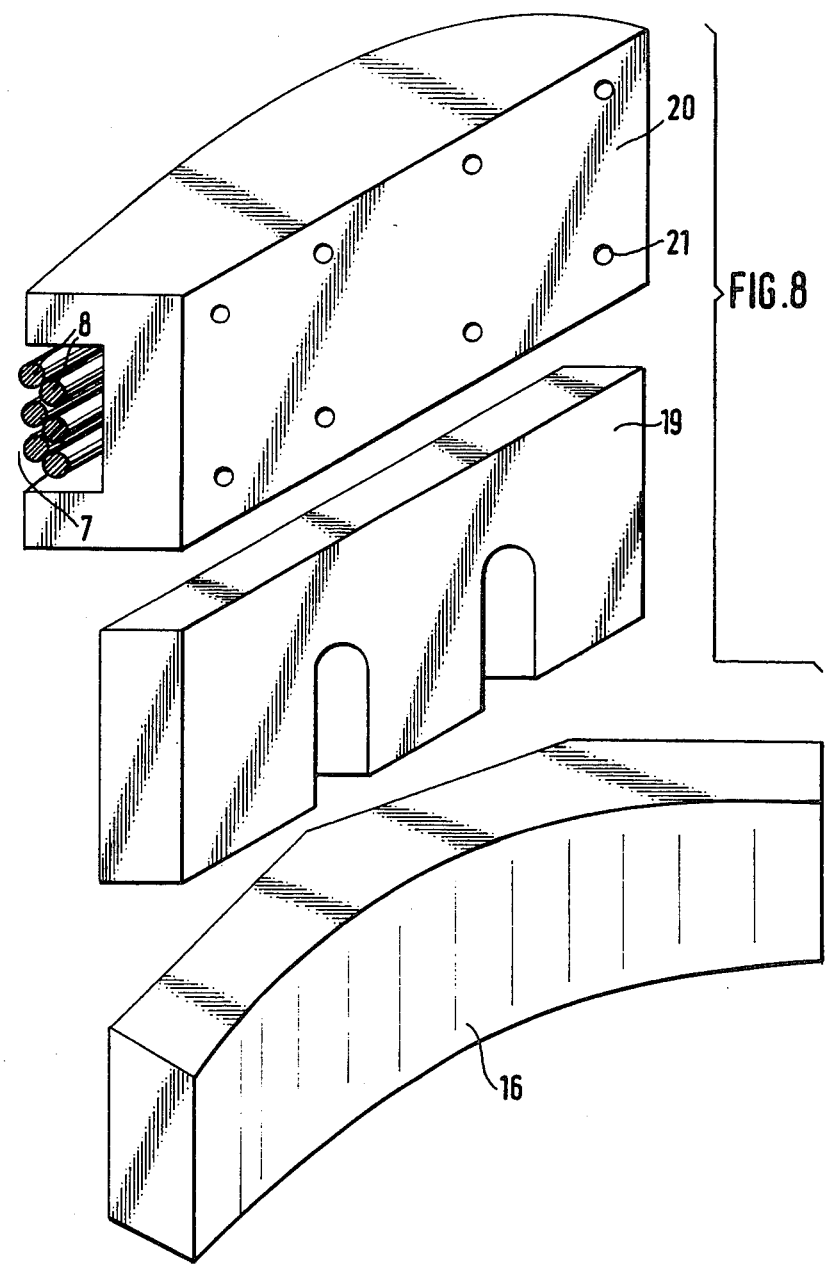
Figure 9:
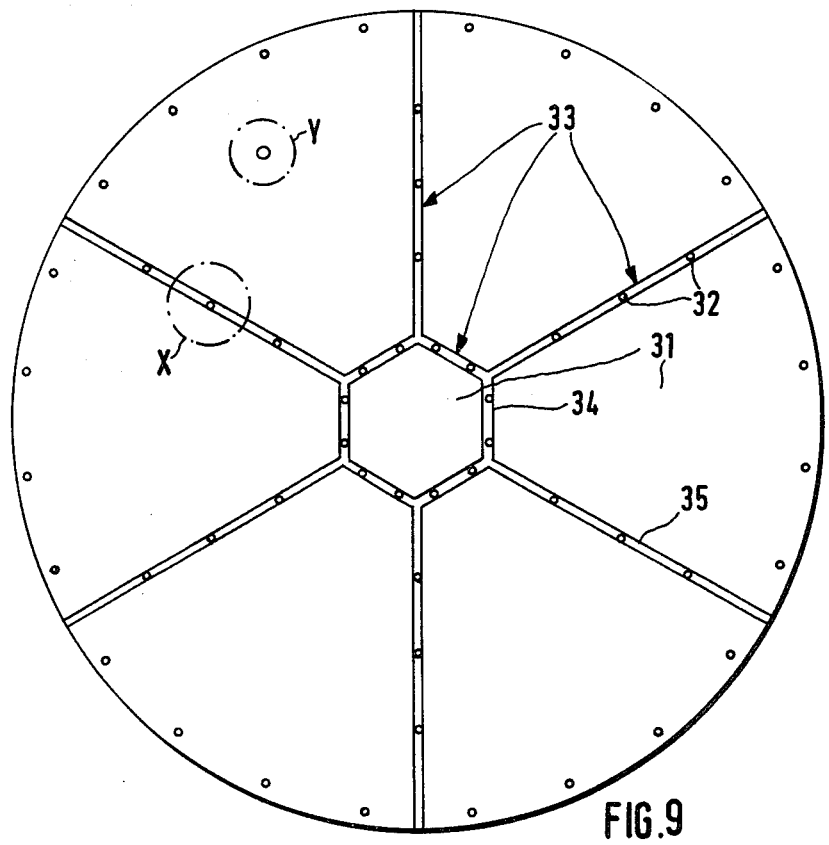
Figure 10:
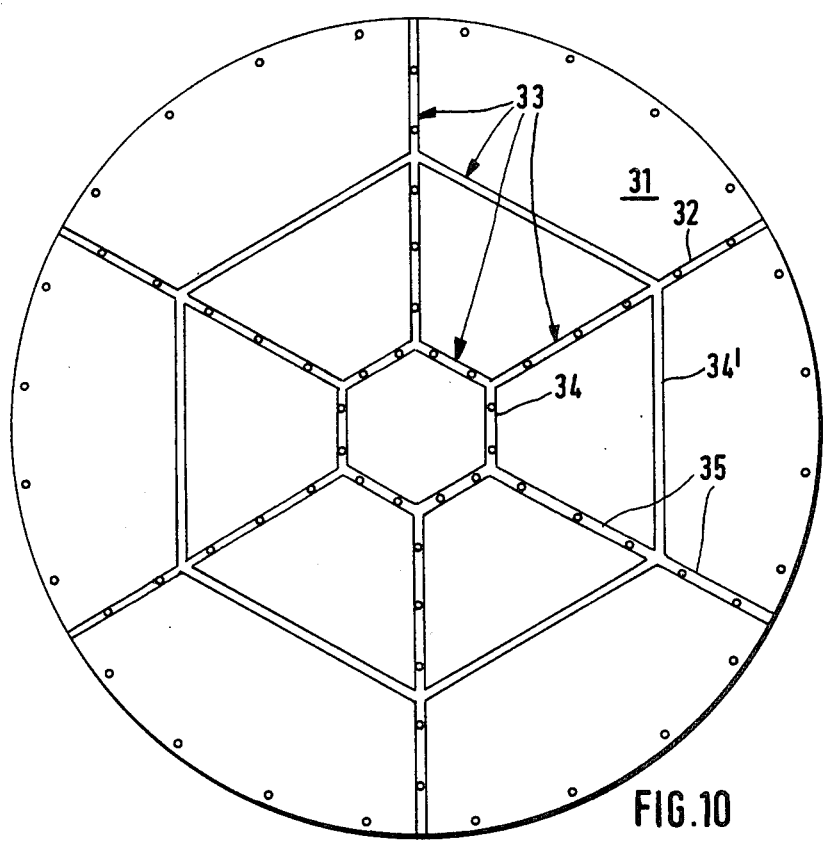
Figure 11:
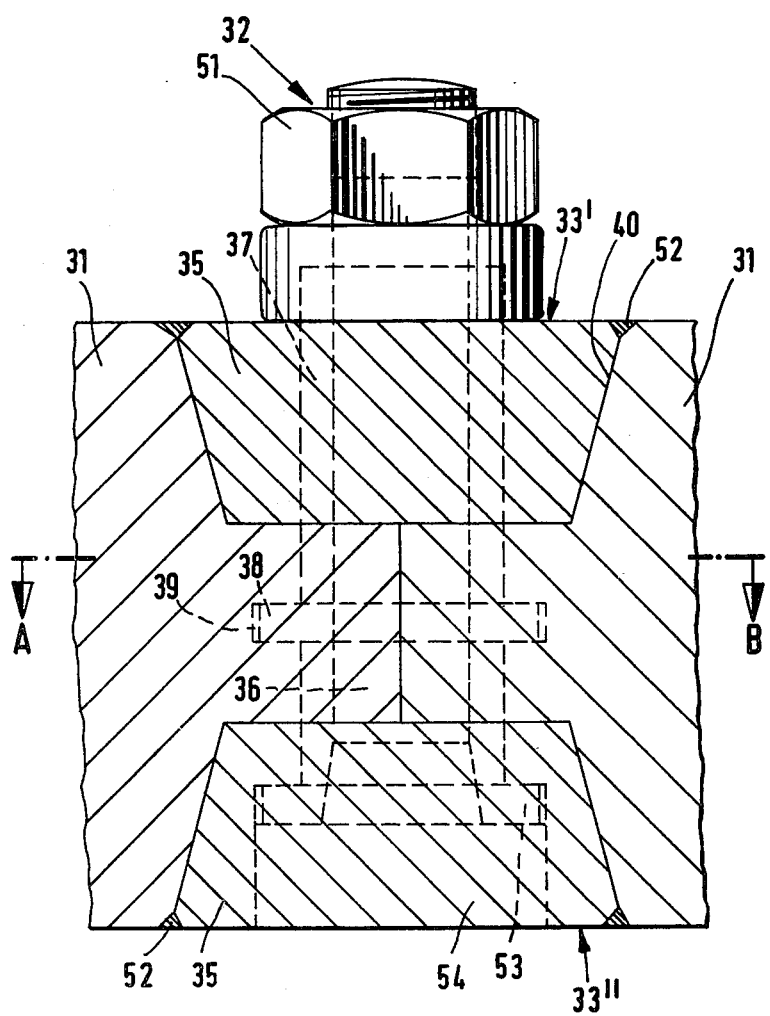
Figure 12:
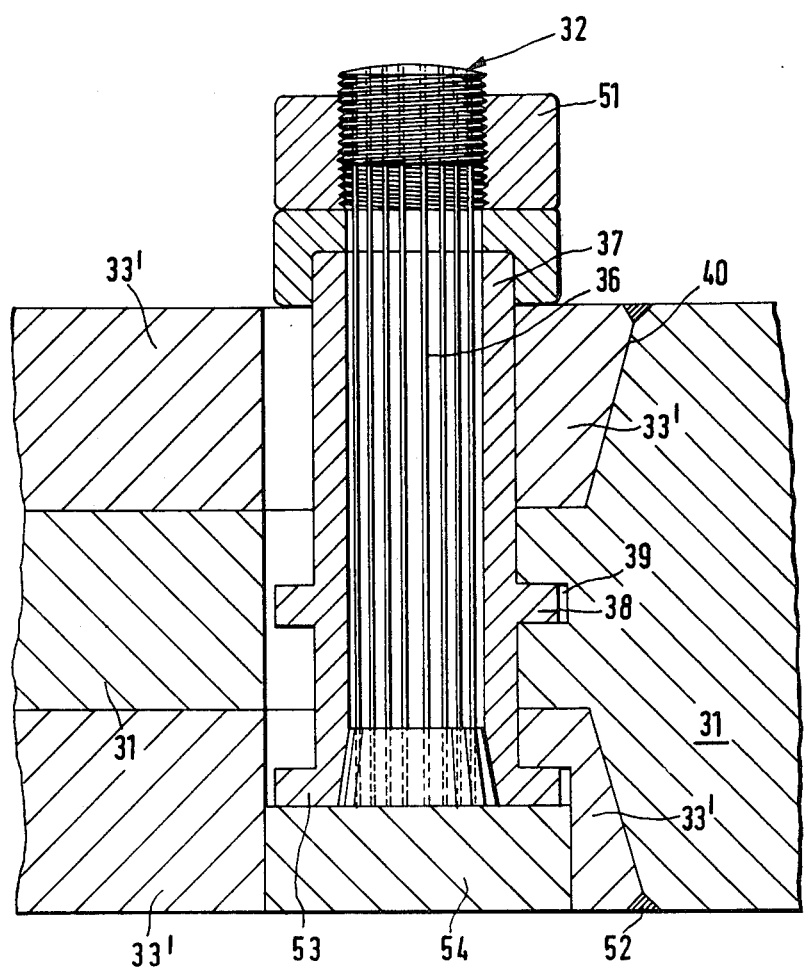
Figure 13:
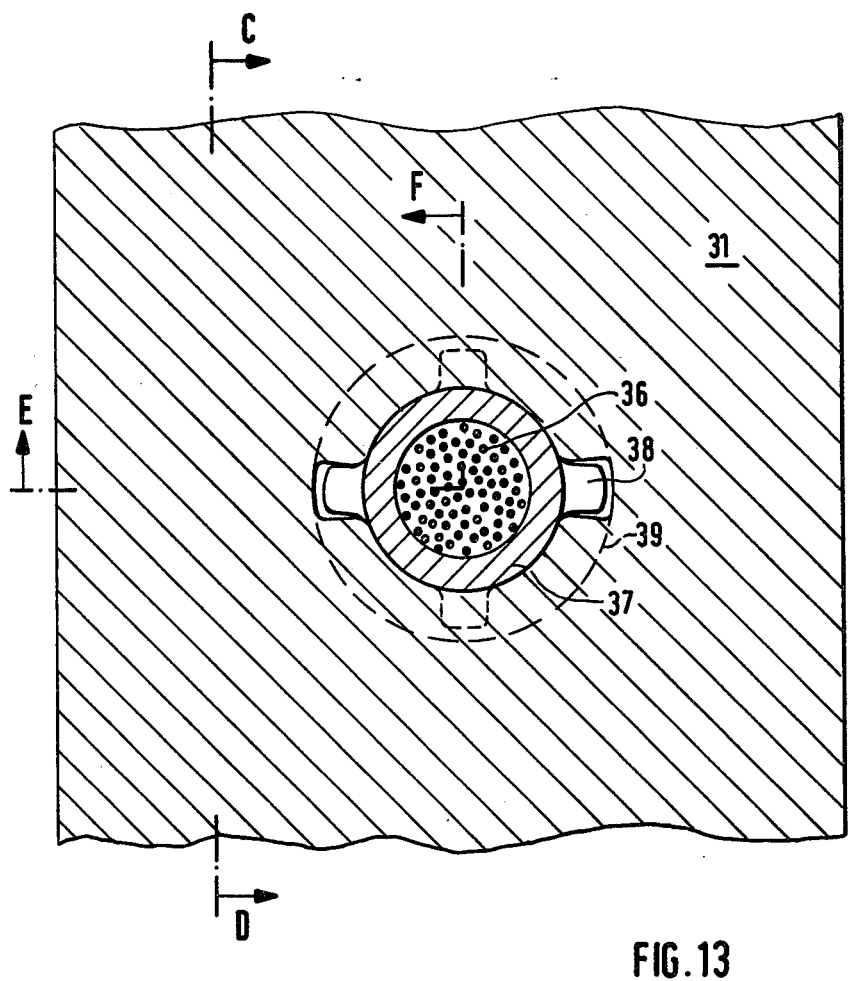
Figure 14:
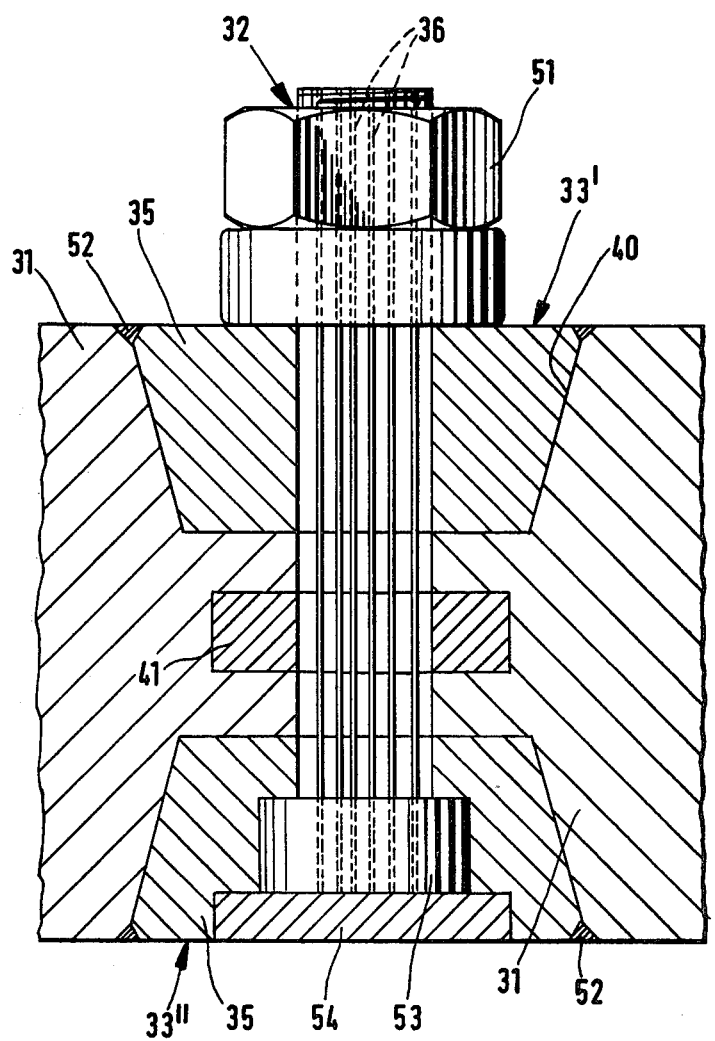
Figure 15:
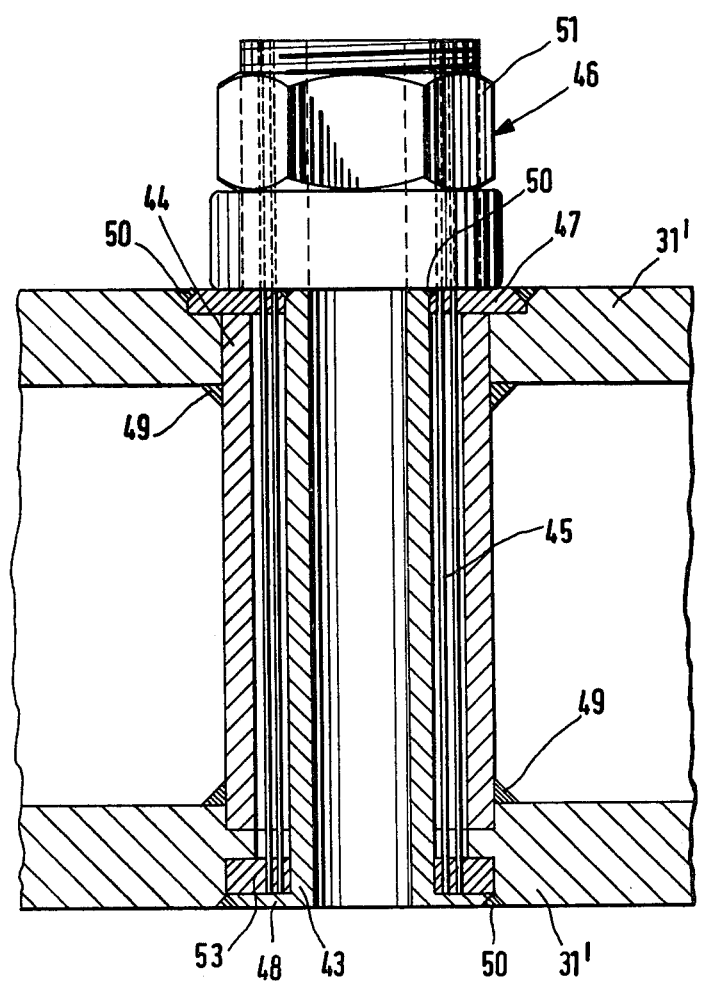

FIG. 1 shows, in a partial longitudinal section, the inventively constructed pressure vessel with wall elements, cover and bottom, FIG. 2 shows a wall fragment from above, FIG. 3 shows in perspective a ring-segment-shaped plate for the construction of the inventive pressure vessel, FIG. 4 shows a further embodiment of a wall plate in perspective view, FIG. 5 shows in perspective a C-shaped ring segment for securing the vessel in the axial direction, FIG. 6 shows a further embodiment for the configuration of such a ring segment, FIG. 7 shows in perspective a portion of the pressure bands surrounding the circumference of the pressure vessel, the individual parts of which FIG. 8 will be seen to illustrate, FIG. 9 shows a cover embodiment in top-plan view, FIG. 10 shows another cover embodiment, also in top-plan view, FIG. 11 shows the detail x of FIG. 9 as a section C–D in FIG. 13, FIG. 12 shows the detail x as a section E–F of FIG. 11, FIG. 13 shows the detail x as a section A–B of FIG. 11, FIG. 14 shows another embodiment in the detail x in a longitudinal section, and FIG. 15 shows the detail Y of FIG. 9 in an enlarged longitudinal section.

FIG. 1 shows the general construction of the pressure vessel. In the case of smaller-diameter vessels the cylindrical wall is formed of rings, in the case of large-diameter vessels of ring-segment-shaped plates 1, which are assembled from the ground up in layers analogously to masonry, the ring-segment-shaped plates 1 of a respective layer being offset—preferably by half a length as shown in FIG. 2—with reference to those of the preceding or succeeding layer. The pressure vessel further has a bottom 17 and a cover 9.

The ring-segment-shaped plates 1 are provided in axial direction with openings 4, such as bores, in symmetrical arrangement. The bores 4 in the plates 1 may be arranged in any desired grouping—but identically for all plate segments—see e.g. FIG. 2, so that upon layered stacking of the plates 1 to produce the wall of the pressure vessel there will always be registering bores 4 present through which the tension cables 10 or like tension means extend in axial direction from one to the other end of the vessel.

The bores also serve to accommodate shear sleeves or pins 15 (FIG. 4) via which the ring-segment-shaped plates 1 of one layer can be connected with the axially preceding and succeeding layers. This facilitates the assembly and offers additional safety in radial direction. Sleeves 15 have the advantage over pins that tension cables 10 can be passed through them.

The symmetrical arrangement of the bores 4 in axial direction of the ring-segment-shaped plates is to permit a layer-wise offset arrangement of the plates 1, bores 4 in the plates 1 being required to register with those in the preceding and succeeding layers to obtain a bore which extends in axial direction through the entire wall of the vessel to permit passing through of the tension cables 10 by means of which the wall of the vessel is subjected to prestressing.

It has been found that the stability of the wall of a vessel assembled from the ring-segment-shaped plates 1, will be greatest if the radial width H of the plates 1 is greater than their thickness d (FIG. 2). When ring segments 1 according to FIG. 3 are used, the thickness d may however by greater than the width H. The ring-segment-shaped plates 1 may, as shown in FIG. 4, be solid plates or, as shown in FIG. 3, they may be hollow plates. In both cases the radial recesses 2 are provided into which the C-shaped ring segments 3 engage, as shown in FIG. 1.

Exemplary embodiments for the ring segments are shown in FIGS. 5 and 6. In both cases the cross-section of the ring segments 3 is C-shaped. In both cases there is also a recess 18 in the upper arm of the ring segment 3, into which the radial arms of circumferentially adjacent ring-segment-shaped plates 1 extend. The embodiment shown in FIG. 4 has holes 6 for the passage of cooling media and the one shown in FIG. 5 has grooves 5 in lieu of the holes 6. Cooling medium can flow through the grooves 5 or holes 6 in axial direction through the double-wall formed by the ring-segment-shaped plates 1 and the ring segments 3.

As the overview in FIG. 1 shows, the ring-segment-shaped plates 1 are stacked in superposed layers whereby, as the right side of FIG. 1 shows, the abutting edges of circumferentially adjacent plates 1 are preferably offset through half a length.

Tension cables 10 are extended through axial openings 4 in the plates 1 and can be pretensioned via tension head 11, pressure-cell ring 12 and pressure plate 13.

As an additional safety for the axial stressing via the tension cables 10 the invention provides the ring segments 3 of C-shaped cross-section. The arms of the ring segments 3 engage in radial recesses 2 of the ring-segment-shaped plates 1 and clamp together respectively superposed plates 1. If for any reason the tension cables 10 break, the ring-segment-shaped plates 1 still cannot fly apart in axial direction because they are prevented from so doing by the C-shaped ring segments.

The fixation of the ring-segment-shaped plates 1 in radial direction is effected by shear sleeves or pins 15, which are inserted half-way into corresponding holes 4 in the plates 1. Respectively superposed plates 1 are thus connected with one another by the shear sleeves or pins 15 and cannot readily separate in radial direction. As an additional safety feature in the radial direction the pressure bands 7, 8 are provided which are placed about the rearward outer face of the C-shaped ring segments and tensioned.

Cooling of the vessel wall can be effected in two ways, namely via the bores 4 for the passage of the tension cables 10 and also via the openings 6 or grooves 5 in the ring segments 3, in the axial direction.

Soft-metal seals 14 may be arranged between the arms of the ring segments 3 and the plates 1. At their abutting junction the ring-segment-shaped plates 1 are welded to one another, before they are additionally mechanically clamped by the ring segments.

The inventive pressure vessel can be provided with a single—but also a double and, if desired, prestressed —bottom 17 and cover 9.

A specially constructed circumferential tensioning system may be provided for the inventive pressure vessel. According to FIGS. 7 and 8 it consists of at least two tension segments 16 which are placed onto the outer side of the pressure vessel and which have a correspondingly curved inner circumferential surface. The outer surface of the segments 16 is planar, but may be broken up into several facets as shown best in FIG. 8. Spacer plates 19 rest against these planar surfaces of the segments 16 and tension shoes 20, about which tension cables or bands 8 are placed, rest in turn against the plates 19.

The installation of the circumferential tensioning system is effected by initially securing the tension segments 16 to the outer wall of the pressure vessel. Then the tension shoes 20 are arranged so as to be distributed over the circumference; the fingers of hydraulic tensioning devices extend through the holes 21 and abut against the planar surfaces of the segments 16. The tension cables 18 are then placed about the tension shoes and via the tensioning devices the tension shoes 20 are drawn radially outwardly under elastic stretching of the tension cables or bands 8. The spacer plates 19 are pushed into the g-ps which in this manner are formed between the spacer shoes 20 and the segments 16, and the tensioning devices are then removed. The thickness of the spacer plates 19 is so selected that upon the removal of the tensioning devices the tension cables or bands 8 continue to be under elastic tension.

According to FIG. 1 the high-pressure vessel cover according to the invention consists of seven disc-segment-shaped plates 1 which are connected with one another via a carrier cross by means of tension screws 2.

The carrier cross 33 consists of two parts, an upper part 33' and a lower part 33" which are of identical construction. Arms 35 extend radially outwardly from the carriers of a hexagonal polygon traverse 34 at the outer part of the cover. The plates 31 are respectively located between the arms 34 and 35 of the upper part 33' and the lower part 33" of the carrier cross 33. The tension screws 32 are extended through holes in the arms 34 and 35 of the carrier cross 33, from one to the other side of the cover and are tensioned, whereby the plates 31 are clamped between the carrier-cross parts 33' and 33".

This can be best explained with reference to the detail X which is drawn to an enlarged scale in longitudinal section in FIGS. 11 and 14. In FIGS. 11 and 14 one sees the radial arms 35 of the upper part 33' respectively the lower part 33" of the carrier cross 33, which are inserted into corresponding recesses 40 in the edges of the plates 31. The tension screw 32 extends through holes in the arms 35 from one to the other side of the cover and may, for example, have its head 53 recessed in the arm 35 of the lower carrier-cross part 33", whereas the nut 51 on the other cover side tensions the tension ropes 36 of the tension screw 32 whereby the plates 31 are connected with one another via the arms 34 and 35 of the carrier cross 33.

For the mechanical clamping of the parts constituting the cover, to facilitate the assembly and increase the strength, as an additional safety measure mechanical clamping elements may be provided.

An example thereof is shown in FIGS. 11, 12 and 13 in various sectional views. A sleeve 37 is concentrically arranged about the tension screw 32 and extended with the tension screw through corresponding holes in the arms 35 of the carrier cross 33. The circumference of sleeve 37 has projections 38 which can be inserted in bayonet-closure manner into corresponding recesses 39 in the plates 31, by turning of the sleeve 37.

FIG. 14 shows a different embodiment of a mechanical clamping arrangement. Here a strap-shaped wedge 41 is inserted between two respective radial arms 35 of the upper part 33' and the lower part 33" of the carrier cross 33; the wedge is provided with holes for the passage of the tensioning screws 32. The wedge 41, together with the radial arms 35 of the carrier cross 33 and the tensioning screws 32, effects an additional mechanical clamping of the plates 37.

After assembly of the cover parts and the mechanical clamping arrangement, and after tightening of the tensioning screws 32, the gaps between the arms 34 and 35 of the carrier cross 33 and the plates 31 can be closed by weld seams 52. The hollow above the head 53 of the tensioning screw 32 can be closed with a filler means 54.

The high-pressure vessel cover can also be made of hollow plates 31'. For such a case FIG. 15 shows, in an enlarged longitudinal section of a detail of FIG. 9, a pass-through, e.g. for clamping rods of nuclear reactors. The tension cables 45 of a tension anchor 46 are guided between two concentric sleeves 43 and 44. The outer sleeve 44 is welded to the interior of the hollow plate segments by ring welds 49; the inner sleeve 43 has at one side a ring flange 48 and at the opposite end it is welded to a ring plate 47 which bears upon the outer sleeve 44 and is welded at its outer circumference at 50 to the plates 31'. A nut 51 serves to tighten the tension anchor 46. This affords a pressure-tight connection between the plates 31' and the pass-through which is sealed with reference to the interior of the hollow plate 31'.

The advantage of the inventive high-pressure-vessel cover is its division into individual, transportable elements which can be assembled in situ in a relatively simple manner. The connection of the cover parts is such that adequate stability and strength of the cover are assured and that even a construction using cooled disc-segment-shaped hollow plates is possible.

The inventive pressure vessel is simple and inexpensive in construction because it can be constructed of preformed parts of relatively small individual weight; due to the dual protection in axial as well as in radial direction it fulfills the requirements made in connection with the construction of pressure vessels.

I claim:

1. Pressure vessel composed of wall elements, cover and bottom, wherein the wall is constructed of ring-segment-shaped steel or cast-steel elements having surface plates and axial openings for the passage of tension cables and cooling media, said elements being stacked in layers and the surface plates of each layer being offset relative to those of the superjacent and subjacent layers, and said plates having radial recesses at the outer side into which ring segments of C-shaped cross-section matingly engage under axial clamping of at least two superjacent plates.

2. Pressure vessel according to claim 1, wherein shear pins are inserted into registering holes of respectively abutting superjacent ring-segment-shaped plates.

3. Pressure vessel according to claim 1, wherein the plates of each layer are offset relative to those of the superjacent and subjacent layers by half the length of a plate.

4. Pressure vessel according to claim 1, wherein the ring segments form with their rear sides the closed outer surface of the vessel, about which pressure bands are placed.

5. Pressure vessel according to claim 1, further comprising two cooling systems formed independently of one another.

6. Pressure vessel according to claim 1, having a circumferential tensioning system of several parts, including at least two tensioning segments, spacer plates and tensioning shoes, about which tension cables or bands are placed and tensioned.

7. Pressure vessel according to claim 1, wherein said cover is prestressed and is comprised of several thick walled disc-segment-shaped plates connected to one another by means of tensioning screws via a carrier cross.

8. Pressure vessel according to claim 7, wherein the carrier cross is mechanically clamped to the adjacent plates.

9. Pressure vessel according to claim 7, wherein the tension cables of the tension screws are surrounded by a sleeve which in turning engages projections of said sleeve with corresponding recesses of the adjacent plates in bayonet-closure manner.

10. Pressure vessel according to claim 7, wherein the carrier-cross is spider shaped and of two parts, consisting of an upper and a mirror-symmetrical lower part and has a central, preferably hexagonal polygonal traverse and arms of trapezoidal cross-section which extend radially from the carriers thereof, which arms lie in corresponding recesses in the edges of adjacent plates, the tensioning screws extended through bores in the arms of the carrier-cross parts from one side of the cover to the other.

11. Pressure vessel according to claim 10, wherein the carrier cross includes polygonal intermediate arms.

12. Pressure vessel according to claim 10, wherein between any two respective radial arms of the upper and lower parts of the carrier cross a strap-shaped wedge having holes for the passage of the tension screws is inserted parallel to the arms which abut in the region of carrier-cross radial arms.

13. Pressure vessel according to claim 1, wherein said cover is comprised of disc-segment-shaped hollow plates.

14. Pressure vessel according to claim 13, wherein the hollow plates have pass-through apertures and wherein tension cables of tension anchors extend between concentric inner and outer sleeves which lead from one to the other side of the hollow plate, of which sleeves the outer sleeve is welded along a ring weld to an upper and lower plate in the interior of the plate, whereas the inner sleeve is welded to an upper side and lower side of the hollow plate via ring plates and ring flanges.

* * * * *